United States Patent
Finke et al.

(10) Patent No.: US 9,430,126 B2
(45) Date of Patent: Aug. 30, 2016

(54) INSERTION OF A BUSINESS OBJECT CREATION INTERFACE INTO AN APPLICATION WINDOW

(71) Applicants: Sabine Finke, Karlsruhe (DE); Joachim Foerderer, Walldorf (DE); Christian Kirschnick, Walldorf (DE)

(72) Inventors: Sabine Finke, Karlsruhe (DE); Joachim Foerderer, Walldorf (DE); Christian Kirschnick, Walldorf (DE)

(73) Assignee: SAP SE, Walldorf (DE)

( * ) Notice: Subject to any disclaimer, the term of this patent is extended or adjusted under 35 U.S.C. 154(b) by 279 days.

(21) Appl. No.: 13/631,365

(22) Filed: Sep. 28, 2012

(65) Prior Publication Data

US 2014/0096067 A1 Apr. 3, 2014

(51) Int. Cl.
*G06F 3/048* (2013.01)
*G06F 3/0484* (2013.01)
*G06F 3/0482* (2013.01)

(52) U.S. Cl.
CPC .......... *G06F 3/0484* (2013.01); *G06F 3/048* (2013.01); *G06F 3/0482* (2013.01)

(58) Field of Classification Search
CPC ...... G06F 3/0484; G06F 3/048; G06F 3/0482
USPC .................................. 715/780, 764
See application file for complete search history.

(56) References Cited

U.S. PATENT DOCUMENTS

| | | | |
|---|---|---|---|
| 5,999,820 A * | 12/1999 | Sutanto et al. ............... 455/508 |
| 6,486,893 B1 * | 11/2002 | Ramchandani et al. ...... 715/762 |
| 7,461,077 B1 * | 12/2008 | Greenwood | |
| 7,673,227 B2 * | 3/2010 | Kotler et al. .................. 715/212 |
| 8,386,953 B1 * | 2/2013 | Young et al. .................. 715/780 |
| 8,566,740 B2 * | 10/2013 | Knight ............................ 715/781 |
| 2003/0001885 A1 * | 1/2003 | Lin et al. ........................ 345/738 |
| 2003/0227482 A1 * | 12/2003 | Bach et al. ..................... 345/762 |
| 2004/0199543 A1 * | 10/2004 | Braud et al. ................ 707/104.1 |
| 2006/0153097 A1 * | 7/2006 | Schultz ........................... 370/254 |
| 2007/0233813 A1 * | 10/2007 | Peng et al. ..................... 709/219 |
| 2007/0266331 A1 * | 11/2007 | Bicker .................. G06F 17/245 715/764 |
| 2009/0249290 A1 * | 10/2009 | Jenkins ................ G06F 9/4443 717/109 |
| 2010/0162159 A1 * | 6/2010 | Sudhi ............................. 715/780 |
| 2011/0320230 A1 * | 12/2011 | Podgurny et al. ............ 705/7.13 |
| 2012/0239701 A1 * | 9/2012 | Rodriguez et al. ............ 707/795 |
| 2013/0346907 A1 * | 12/2013 | Arend et al. ................... 715/779 |

\* cited by examiner

*Primary Examiner* — Jennifer To
*Assistant Examiner* — John Repsher, III
(74) *Attorney, Agent, or Firm* — Brake Hughes Bellerman LLP

(57) ABSTRACT

The present description refers to a technique for receiving a request to create a new business object where the request includes one or more business object attributes, determining a type of business object based on one or more business object attributes, identifying a plurality of fields associated with the type of business object, selecting a subset of the plurality of fields, causing a business object creation interface to be inserted into the application window including the selected subset of fields, receiving, information entered into the one or more fields by a user via the business object creation interface, generating the new business object with the received information, causing the new business object to be added to the list of business objects in the application window, and causing the business object creation interface to be removed from the application window.

20 Claims, 10 Drawing Sheets

710

| INDIVIDUAL GOAL | Save Cancel Request Approval Delete ⊗ |
| --- | --- |
| ○ Get 10 new customers i... 👤 | OVERVIEW  ACTIVITIES (0)  FEEDBACK(0)  EVALUATION |

DETAILS

Get 10 new customers in 2012  ╱―714      716

Get in contact with as many customers as possible. At the end of the year at least 10 customers should signed up for the new product My Goal is  ○ informal ⦿ Relevant for Evaluation

718 —  [ 👤                                            → ]

BUSINESS UNIT

720 — [                                                  ]

OWNER

722 — [                                                  ]

⋮

724 — [                                                  ]

726  728

Save  Cancel

FIG. 7

INSERTION OF A BUSINESS OBJECT CREATION INTERFACE INTO AN APPLICATION WINDOW

TECHNICAL FIELD

This description is directed generally to creating business objects, and in particular, to an insertion of a business object creation interface into an application window.

BACKGROUND

Business objects are real world entities, concepts and activities modeled as objects in an information system. Business objects may encapsulate both data structures and the functions or services applied to the data, while hiding their full complexity from other objects. This encapsulation of data and functions/services makes it easier to modify program components by allowing one to program with the relevant entities without having to know all the implementation details. Business objects also allow for the reuse of existing functions.

In some cases, when a user is in an application window, a separate pop-up window may be opened to allow a user to input additional information for the application. The separate pop-up window may interrupt the user's work flow. For example, the user may have to move or resize the pop-up window in order to view the contents of the application window and the contents of the pop-up window simultaneously.

SUMMARY

In one general aspect, a computer-readable storage medium storing one or more programs is provided. The one or more programs include instructions, which when executed by a server system, cause the server system to provide a list of business objects to a user for display, where the list of business objects is displayed in an application window, receive a request to create a new business object, the request including one or more business object attributes, determine a type of business object based on the one or more business object attributes, identify a plurality of fields associated with the type of business object, select a subset of the plurality of fields associated with the type of business object, cause a business object creation interface to be inserted into the application window in response to the receiving the request, the business object creation interface including the selected subset of fields to allow the user to enter information for the new business object, receive, via the business object creation interface, information entered into the one or more fields by the user, generate the new business object with the received information, cause the new business object to be added to the list of business objects in the application window, and cause the business object creation interface to be removed from the application window.

In another general aspect, a computer implemented method is provided that includes providing a list of business objects to a user for display, wherein the list of business objects is displayed in an application window, receiving a request to create a new business object, the request including one or more business object attributes, determining a type of business object based on the one or more business object attributes, identifying a plurality of fields associated with the type of business object, selecting a subset of the plurality of fields associated with the type of business object, causing a business object creation interface to be inserted into the application window in response to the receiving the request, the business object creation interface including the selected subset of fields to allow the user to enter information for the new business object, receiving, via the business object creation interface, information entered into the one or more fields by the user, generating the new business object with the received information, causing the new business object to be added to the list of business objects in the application window, and causing the business object creation interface to be removed from the application window.

In another general aspect, an apparatus includes one or more processors and a memory, providing logic configured to provide a list of business objects to a user for display, wherein the list of business objects is displayed in an application window, request receiving logic configured to receive a request to create a new business object, the request including one or more business object attributes, determining logic configured to determine a type of business object based on the one or more business object attribute, identification logic configured to identify a plurality of fields associated with the type of business object, selection logic configured to select a subset of the plurality of fields associated with the type of business object, insertion logic configured to cause a business object creation interface to be inserted into the application window in response to the receiving the request, the business object creation interface including the selected subset of fields to allow the user to enter information for the new business object, information receiving logic configured to receive, via the business object creation interface, information entered into the one or more fields by the user, generating logic configured to generate the new business object with the received information, adding logic configured to cause the new business object to be added to the list of business objects in the application window, and removing logic configured to cause the business object creation interface to be removed from the application window.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

BRIEF DESCRIPTION OF THE DRAWINGS

FIG. 7 is a diagram illustrating a new application window 710 that is opened or generated by business application 120 and provided to client computer 130 for display in response to a user selection of a full business object icon according to an example implementation.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
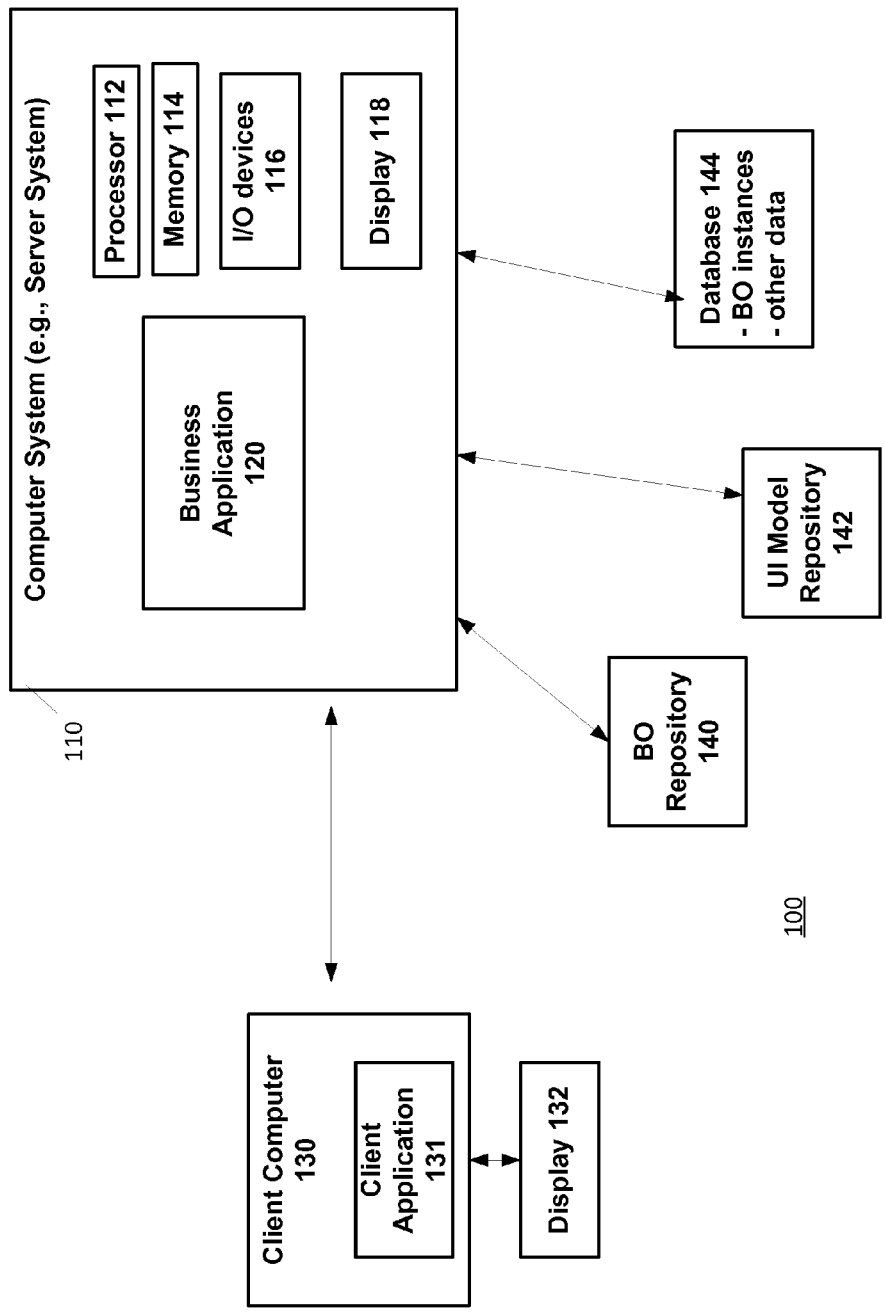
FIG. 1 is a block diagram of a system according to an example implementation.

FIG. 1 is a block diagram of a system according to an example implementation. System 100 includes a client computer 130 and a computer system 110 (which may also be referred to as a server system 110). Client computer 130 may include a processor, memory, input/output devices (not shown), and a display 132. Client computer 130 may also include one or more applications, such as a client application 131, which may be, for example, a Web browser. According to an example implementation, client application 131 may be, or may include, a Silverlight application or browser plug-in from Microsoft Corporation, which may allow for animation and other multimedia presentations on client application (or web browser) 131.

Computer system 110 may be a server, for example, and may include a processor 112, memory 114, input/output devices 116, a display 118, and other blocks not shown. Computer system 110 may include a business application 120 for generating a user interface to client computer 130. The user interface received and displayed by client application 131 from business application 120 may include one or more application screens or windows. As part of generating and providing a user interface to client computer 130, business application 120 may perform tasks related to displaying and updating business objects, including, for example, generating a window that includes a list of existing business objects, inserting a business object creation interface within the displayed window, and updating the list of business objects based on information received for the business object creation interface.

According to an example implementation, computer system 110 may be coupled to or may be in communication with a business object (BO) repository 140, a user interface (UI) model repository 142, and a database 144.

BO repository 140 may include, for example, metadata that describes the structure and identifies various fields for each of a plurality of business objects. Example business objects may include a goal business object and a sales order business object. Other types of business objects may be used. Each business object includes a plurality of fields or attributes. Each business object may include a different set of fields and functions. For example, a goal business object may include fields such as goal title, goal description, etc. A sales order business object may include fields such as product ID, product unit price, date of sale, customer ID (or customer name and address), subtotal, total, etc. Each instance of a business object may have different values provided for each of the fields. For example, each instance of a goal business object may have a different title, goal description, etc.

User interface (UI) model repository 142 may include information that describes each of a plurality of user interfaces. The UI model repository 142 may include control information and display information for each UI. For example, for control information, the UI model repository 142 may describe UI control functions, such as describing the operation of various functions in the UI such as save, cancel, delete, and animation information describing animation or motion that are included in a UI. The UI model repository 142 also includes information describing the appearance of the UI, such as the display characteristics of one or more display elements in the UI, such as size, font, and color of text, size, location and shape of various boxes or other shapes or elements in the UI, and other information that describes the appearance of the UI.

Database 144 may include information such as business object instances. Database 144 may also include other information such as local (or localization) information that may include, for example, username or login information for each user or employee, country, address (or location information), and display format information for each user, a manager, organizational unit/org unit for a user/employee, a division for each user/employee, and user-specific (or group-specific) preferences such as user-specific preferences relating to specific fields, or subsets of fields, that should be displayed for different business objects. As described in greater detail below, database 144 may also include statistical information for each user, or for a group of users, relating to usage of each of a plurality of fields in each of a plurality of user interfaces.

Figure 2:
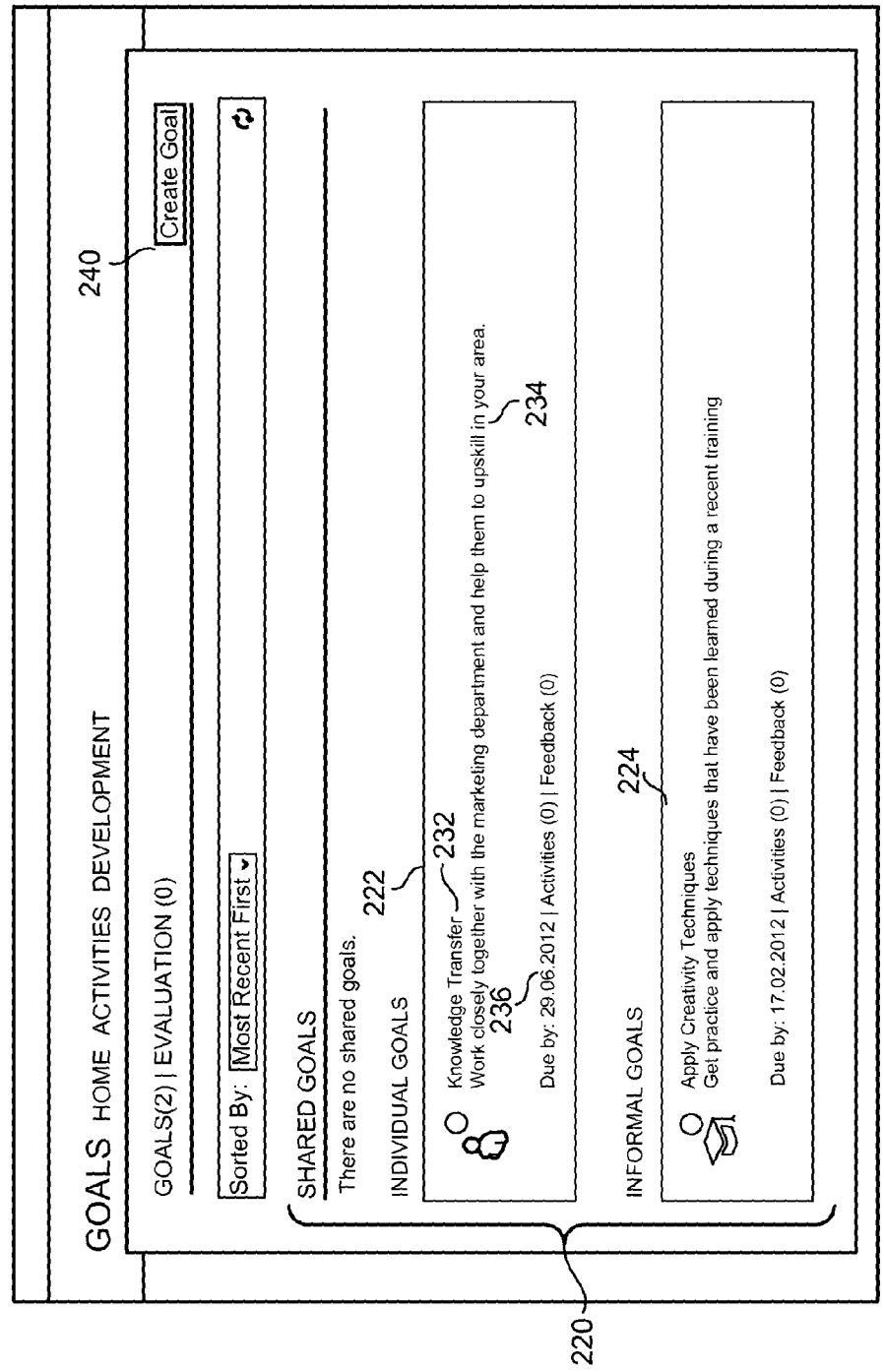
FIG. 2 is a diagram illustrating an application window 210, including a list of business objects, that is generated by business application 120 and provided to client computer 130 for display according to an example implementation.

FIG. 2 is a diagram illustrating a user interface (UI) that includes an application window 210, including a list of business objects, that is generated by business application 120 and provided to client computer 130 for display according to an example implementation. Business application 120 may create, store, update and maintain one or more business objects. For example, business application 120 may create a new business object in response to receiving request to create a new business object, update a business object in response to receiving a request to update or edit an existing business objects, may delete an existing business object in response to receiving a request to delete such business object, and other functions related to creating, storing and updating business objects. Business application 120 may also generate and output a user interface to client application 131 of client computer 130, where the user interface may include one or more windows or screens that are displayed by the client application 131 or other software on client computer 130. Client computer 130 (e.g., including client application 131) may display any windows or user interfaces (or other information) received from business application 120 on client display 132. Also, a user, operating at client computer 130, may input information on or via user interfaces or windows received from business application 120. The user may input text, or may select submit, save, cancel or other icons provided on the window or user interface, and this information may then be communicated or sent back to the business application 120 where the requested processing may be performed (e.g., create new business object, update an existing business object, submit other information or request for processing, text or other information may be saved by business application, etc.).

According to an example implementation, an application window 210 may be generated by business application 120 and provided to client computer 130 for display. Application window 210 includes a list 220 of current or existing business objects, such as, for example, business objects 222 and 224 that relate to different goals. Business object 222, for example, is directed to an individual goal of "knowledge transfer", and business object 224, for example, is directed to an informal goal of "apply creativity techniques." These are merely some example business objects and others and any number of existing business objects may be provided.

Each business object may include one or more fields or attributes. For example, business object 222 includes a title field 232 of "knowledge transfer", a description field 234 that provides a brief description of the goal, and a "due by" field 236, as some example fields or attributes. Business object 224 may similarly include one or more fields or attributes.

As shown in FIG. 2, a create business object icon 240 (a icon labeled as "create goal") is provided and displayed as part of application window 210. According to an example implementation, a user may use a mouse, touchpad or other pointing device or input device to select the create business object icon 240 in order to request that a new business object be created of type "goal."

According to an example implementation, business application 120 may generate application window 210 as a web page based on the UI model repository 142, and then transmit the web page to the client application 131. For example, business application 210 may access the control information and display information for a UI model (used to generate application window 210) in UI model repository 142, and may generate the application window 210 based on the UI model and the specific data provided for application window 210. For example, the UI control information for the UI model may specify the function of the create goal icon 240, and the display information of the UI model may specify, for example, the size, location and shape of the boxes and text within application window 210. Specific data/text within each box of application window 210 may be input by a user and/or stored for display.

According to another example implementation, separate control information from the UI model, display information form the UI model, and data for the application window 210 may be sent from the business application 120 to client application 131, where the client application 131 may generate the application window 210 for display based on this information. For example, client application 131 may be, or may include a Silverlight application or Silverlight web browser plug-in from Microsoft Corporation, for generating the application window 210 based on the control information, display information and data sent by the business application 120 to the client application 131.

Figure 3:
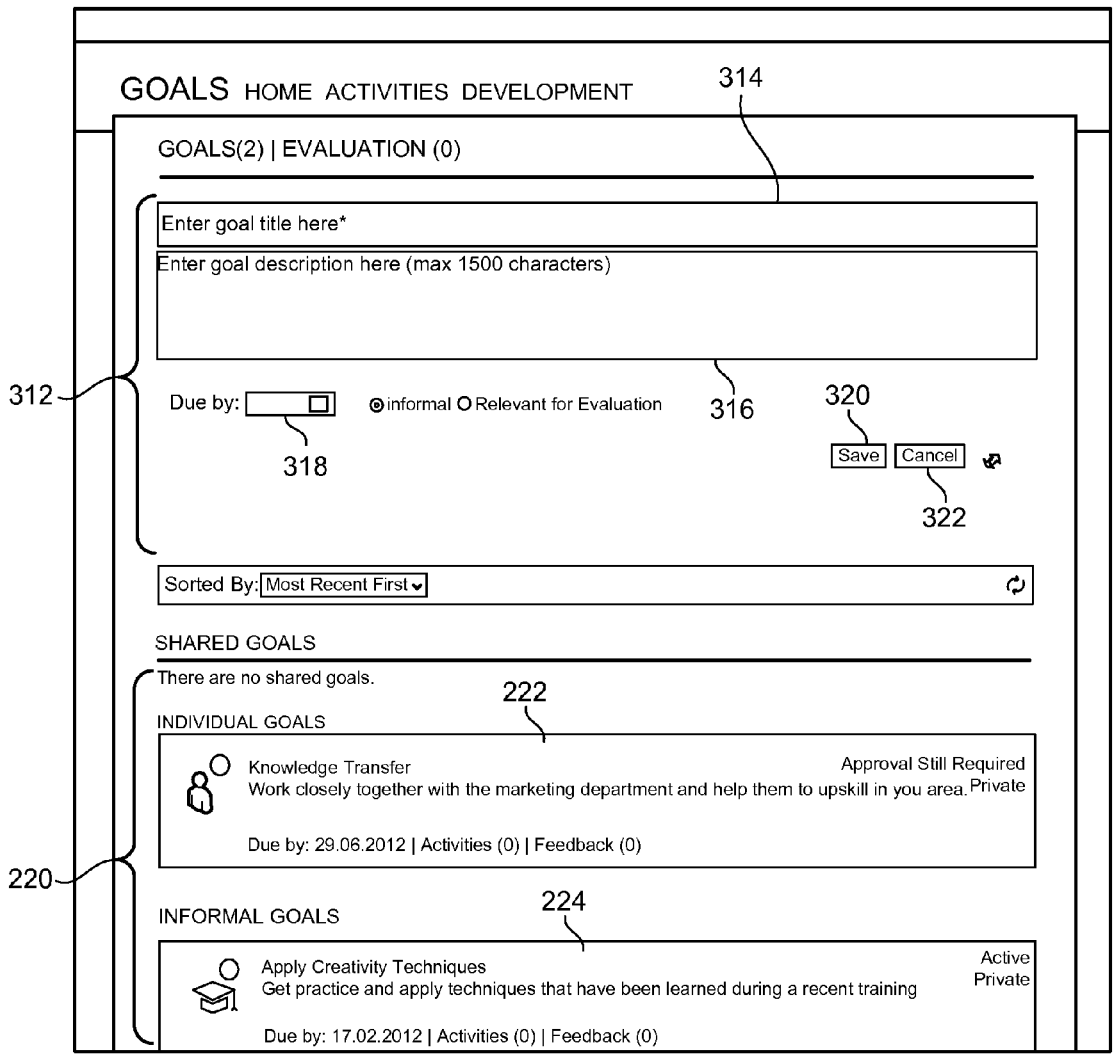
FIG. 3 is a diagram illustrating an application window 310, including a business object creation interface within the displayed application window, that is generated by business application 120 and provided to client computer 130 for display according to an example implementation.

FIG. 3 is a diagram illustrating an application window 310, including a business object creation interface within the displayed application window, that is generated by business application 120 and provided to client computer 130 for display according to an example implementation. A selection of the create business object icon 240 (shown in FIG. 2) may be received by business application 120, e.g., in response to a user selecting icon 240, for example. Business application 120 inserts a business object creation interface 312 within the displayed application window 310 in response to receiving the selection of the create business object icon 240. Business object creation interface 312 may be provided to allow information to be input for a new business object.

According to an example implementation, business application 120 may insert (or open) the business object creation interface 312 by pushing down (or alternatively, pushing up) the list 220 of existing business objects within application window 210/310 to create an open area in the application window, and then inserting the business object creation interface 312 in such open area, resulting in application window 310 as shown in FIG. 3.

For example, in a webpage, the location of the list 220 of existing business objects may be moved down by providing an updated web page where one or more HTML (Hypertext Markup Language) Position statement(s) in the HTML (Hypertext Markup Language) code have been adjusted to move the elements of list 220 down one or more lines. HTML code may be generated by business application 120 for the updated web page (e.g., application window 310, FIG. 3) to insert the business object creation interface 312 into the open area. This updated web page for application window 310 may be sent from business application 120 to client application 131 for display, according to an example implementation.

Similarly, when using a Silverlight application or plug-in at the client application 131, for example, the UI display information for the application window 310 may be adjusted to move the list 220 of existing business objects down one or more lines to create an open area, and to insert the business object creation interface 312 into this open area. In one example implementation, UI display information for the application window 210/310 may be provided as Extensible Application Markup Language (XAML) code. Also, XAML code may be used to adjust the location of one or more objects of the list 220, e.g., in order to create an open area to insert the business object creation interface 312. This adjusted UI display information, where UI elements of list 220 have been moved to create an open area for the business object creation area 312, may be sent from the business application 120 to the client application 131, where the Silverlight application generates an updated application window 310 (FIG. 3). For example, if a Silverlight application is used for client application 131, XAML code may be used to provide display information for the application window 310, including size and location of various boxes and other elements of the list 220. As an example, Top and Left statements (e.g., X.Top and X.Left) statements may be used in XAML code to specify the location of one or more elements (e.g., boxes, text) of application window 310. For example, the values for one or more X.Top statements may be adjusted or increased to move one or more of the boxes or other elements of the list 220 down, thereby creating an open area where the business object creation area 312 may be inserted. This is merely an example technique, and other techniques may be used to create an open area in which a business object creation interface 312 may be inserted within an existing application window.

Business object creation interface 312 may include one or more entry fields to allow a user to input information, details or text to specify one or more fields of the new business object. An entry field may be a field or attribute in which a user may input or enter text or information for the field. For example, business object creation interface 312 may include a goal title entry field 314, a goal description entry field 316, and a due by entry field 318. These are merely some examples, and any entry fields may be provided.

Business object creation interface 312 may also include one or more selectable icons, such as a save icon 320 that allows a user to save the information input via the entry fields as a new business object, or a cancel icon 322 that allows a user to cancel the request to create a new business object. If a user at client computer 130 selects the cancel icon 322 within the object creation area 312 of application window 310, this information (request to cancel the creation of the new business object) may be sent back to business application 120, which may cause the business application 120 to close or remove the business object creation interface 312 from the application window 310. If a user selects the save icon 320 within the object creation area of application window 310, this save request is then sent back to business application 120, causing the business application 120 to save the information or text entered into one or more entry fields of the business object creation interface 312 as a new business object. The new business object may be added to the list of existing business objects, which are displayed, and the create business object creation interface 312 may be closed, according to an example implementation.

According to an example implementation, when requested (e.g., in response to selection of the create business object icon 240), the business object creation interface 312 may be opened or inserted within the existing application window 210/310 as a quick-create pop-in area 312, which may be popped in or inserted into the existing application window, rather than being provided in a new (separate) window that may be created or popped up, for example. For example, by inserting the business object creation interface 312 into the existing application window (rather than providing such area 312 as a new pop-up window), this allows the business object creation interface 312 and at least a portion of the list 220 of existing business objects to be displayed together and/or to be viewable together at the same time on the displayed application window 310. According to an example implementation, after the business object creation interface 312 has been inserted into the application window 210/310, and before the business object creation interface 312 has been removed, the displayed application window 310 may be scrollable up and/or down to allow a user to view the business object creation interface 312 in parallel or at the same time as the list 220 of existing business objects.

Thus, inserting the business object creation interface 312 into the application window 210/310 may have advantages over opening such business object creation interface 312 as a new window (e.g., new pop-up window) that is separate from the application window 210 that includes the list of existing business objects. For example, inserting the business object creation interface 312 into or within the existing application window 210/310 allows a user to view both the business object creation interface 312 and the list 220 of existing business objects at the same time or in parallel (e.g., by scrolling up or down as necessary), without switching between or having to manipulate separate windows. This may allow a user to view a title, fields or other details of one or more existing business objects during the creation of the new business object, e.g., where one or more fields of an existing business object may be copied or relied upon to enter information for the entry fields for the new business object. Thus, in parallel to the business object creation process, which may include a user creating a new business object by typing in one or more entry fields for the new business object into the business object creation interface 312, the user may also view and scroll through the list 220 of existing business objects, all in the same application window.

On the other hand, opening the business object creation interface 312 as a separate window may have a disadvantage of requiring a user to switch between or manipulate these two windows (new window for new business object and the application window 210 with the list of existing business objects), and/or to carefully size and/or overlay one window over the other, in order to view both the list 220 of existing business objects and the business object creation interface 312, for example.

Therefore, according to an example implementation, the business object creation interface 312 may be provided or opened in-place as a pop-in, e.g., the business object creation interface 312 may be opened or inserted within the existing application window 210/310. In one example implementation, the business object creation interface 312 that is inserted within the existing business application window 210/310 may include only a subset of all the fields for the new business object, such as only the required entry fields for the object. In another example implementation, the business object creation interface 312 may include both the required entry fields and one or more optional or non-required entry fields (such as one or more of the most commonly used optional entry fields). For example, business object creation interface 312 may include one or more required fields, such as the title field 314, and one or more optional fields, such as the due by field 318 (or one or more non-required fields that are most often needed or used by users, for example).

According to an example implementation, business application 120 may receive a request (e.g., request input by a user at client computer 130 when user selects icon 240) from client application 131 to create a new business object. The request to create a new business object may include one or more attributes or fields such as a business object type (to be created), or other field such as a user name or user login information, field identification (identification of one or more fields to be displayed in new business object), local information (e.g., country or location of user/employee, format information, a group, business org. unit, manager or other information for the user/employee), or other field that may provide a basis for determining a subset of fields to be displayed in the business object creation area 312.

In response to the request to create the new business object, business application 120 may identify a plurality of fields associated with the business object type identified in the request. According to an example implementation, business application 120 may retrieve the business object from business object (BO) repository 140 that corresponds to the business object type identified in the request. As noted, the business object from repository 140 may include or may identify a plurality of fields. Any of these fields, or even all of these fields, of the requested business object, may be displayed in application window 310 or other window in response to the request to create this business object.

Business application 120 may then select a subset of the plurality of fields associated with the type of business object identified in the request. This subset of fields (or entry fields) may be displayed in the business object creation interface 312 to allow a user to enter information for each of these fields.

A variety of different techniques may be used to identify the subset of fields associated with the type of business object to be displayed in the business object creation interface 312. For example, a subset of fields may be displayed that have been specified by the user in advance. For example, each user may specify, e.g., in advance, a subset of fields for each of one or more business objects to be displayed in the business object creation area 312 when the business object is created, e.g., a subset of fields associated with the user for each of a plurality of business objects. In another example implementation, a subset of fields may be specified that are associated with a manager, business org. unit, division for each of a plurality of business objects. Thus, for example, if a user/employee works for a manager or within a division or org. unit, upon receipt of a request to create a business object, the business object creation interface 312 may be automatically populated with a subset of fields that have been specified for the requested business object and associated with the user, or associated with the user's manager (or group), division, org. unit, etc.

In another example implementation, a subset of fields may be displayed in business object creation area 312 for a business object, where the subset of fields have been identified in one or more parameters of the request to create the new business object. For example, the request to create a new business object may include fields including: the type of business object to be created, and one or more additional fields that identify one or more fields to be displayed in the business object creation area 312 for the new business object.

Or, in another example implementation, a subset of fields may be selected that are most commonly used by this user for this business object, or are most commonly used by a community or group/plurality of users for this business object. For example, database 144 may maintain data or statistics that record which fields have been used by users for which business object and/or the number of times a field has been used or filled in by a user or group of users for each of a plurality of business objects. Thus, a set of the most commonly used fields may be obtained from database 144 for each business object, for each user, or for a group of users or community of users. Thus, for example, business application 120 may, in response to the request to create the new business object, request and obtain, from database 144, a list or subset of fields that were used (e.g., displayed and/or filled in by the user for a business object) more than X times, or more than Y % for the current user, or for a group or plurality of users over some time periods, e.g., over the last Z days or weeks or months. This is merely an example, where X, Y and Z can be any numbers. Thus, a subset of fields (e.g., a subset of all the fields, or the full set of fields, identified by the business object repository 140 for the specified business object) may be identified by database 144 for a business object that have been used more than a threshold number of times or used more than a threshold percentage of times that a business object was created, for example.

As another example implementation, database 144 may generate and track a field usage score for each field of each business object, where a higher score is assigned to fields that are used more often, and a lower score is assigned for fields used less often. Thus, for example, database 144 may be notified each time a field is used for a new business object, and the usage score may be increased each time the field for a business object is used or included within an application window for an object, for example. Usage scores for one or more fields may be tracked by database 144 for each user, and for each field for each business object, for example. According to an example implementation, a subset of fields may be selected for a business object that include fields having a usage score greater than a threshold number, for example. Thus, in response to the request to create a new business object, business application 120 may send a request to database 144 to obtain a list of fields having a highest usage score for the identified business object. Database 144 may then identify and return such list of fields to the business application 120.

Or, in another example implementation, business application 120 may request and receive from database 144 a list/subset of fields for the requested business object that are associated with: the user, a business organizational unit, a division, a manager, or other parameter. Or, the business application 120 may request and receive from database 144 a subset of fields that have been assigned by a user or administrator as being required fields for this business object. Also, for example, business application 120 may select a subset of fields for this requested business object that have been indicated as being required, plus a specific number (e.g., 1 or 2) of fields that are the most commonly used non-required fields. Other techniques may be used to identify a subset of fields to be displayed in the business object creation area 312 for the requested business object.

The insertion of a business object creation interface 312 into the existing application window 210/310 may have a number of example advantages, including, for example: There is no (or at least less) window handling (e.g., switching between windows) needed, since the business object creation process is provided as part of the current or existing application window; there is little or no (or at least less) interruption of a current task flow for the user since the business object creation interface is provided in a same window; there is a smooth integration of the business object creation interface 312 into the existing application window 310; a list 220 of already existing business objects can be viewed in parallel (or at the same time) to the business object creation interface 312, so the user can search for similar objects, e.g., to allow for re-use of data for attributes or fields from other/existing business object(s); the usage of the business object creation interface 312 may be provided in a simple and compact area, since only a subset of all of the possible entry fields for the new business object are displayed in the business object creation interface 312, e.g., only required entry fields, or only required entry fields plus a subset of non-required fields; and, a user may open a new window for the creation of the business object to view a more complex user interface (e.g., complete or fuller set of fields) for the creation of the new business object, e.g., if the user would like to view or enter data for other fields not shown or to view a full set of entry fields for the new business object, for example. In this manner, according to an example implementation, a progressive system may be provided in which 1) a business object creation interface 312 may first be inserted or opened into the existing application window, where the business object creation interface 312 includes a subset of fields for ease of use and ease of viewing both the new object and one or more existing objects (or a list of one or more existing business objects), and 2) the user may have the option to open a new application window for the new business object that may include a full (or more complete) set of entry fields for the business object where data may be input for the new business object, for example. See, e.g., description herein related to FIGS. 6-8 for further information on the use of the new application window with a full set of fields for the business object.

Figure 4:
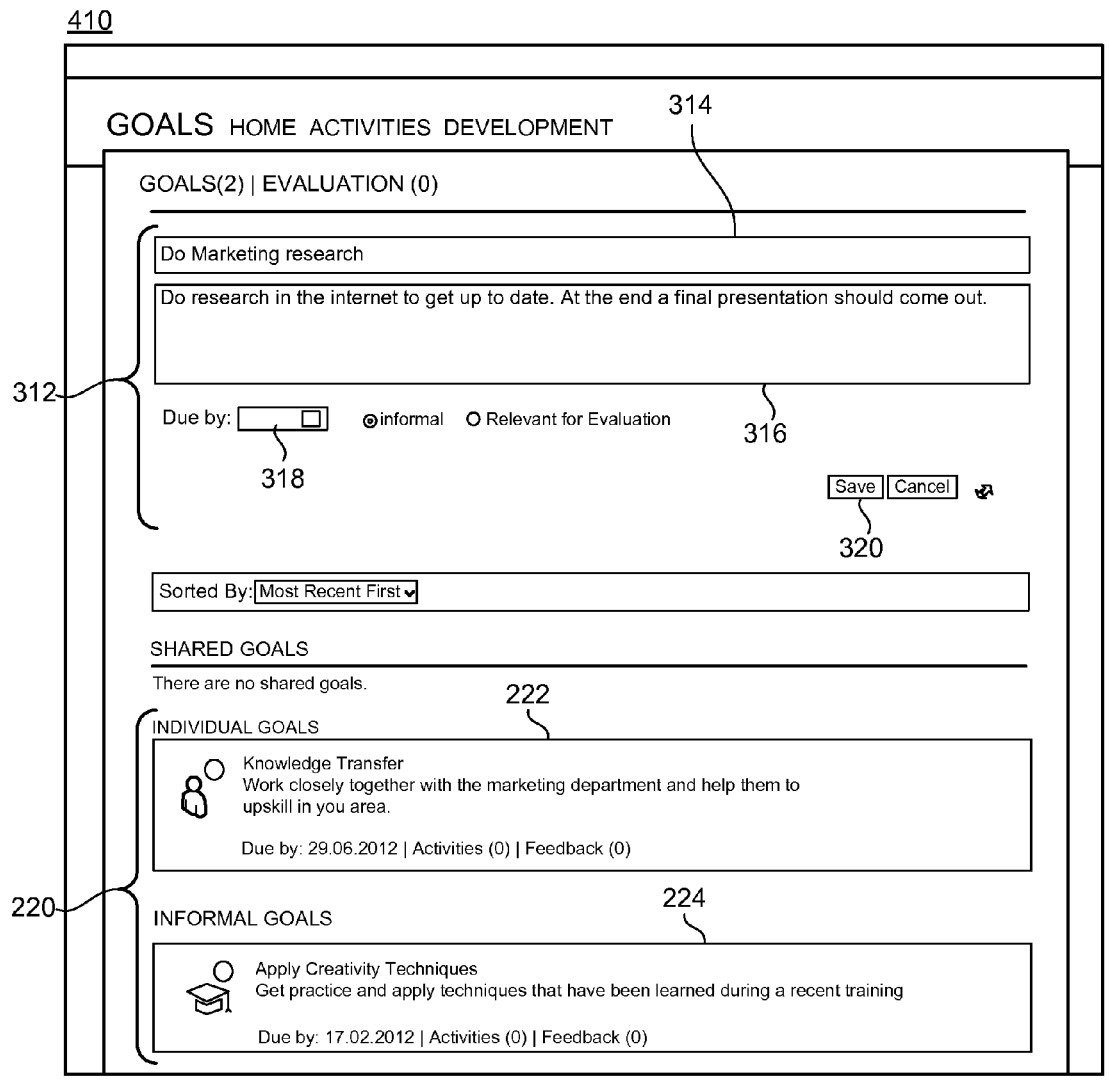
FIG. 4 is a diagram illustrating an application window 410 that is generated by business application 120 and provided to client computer 130 for display according to an example implementation.

FIG. 4 is a diagram illustrating an application window 410 that is generated by business application 120 and provided to client computer 130 for display according to an example implementation. Application window 410 is shown in FIG. 4 in which a title has been entered by a user into title entry field 314 (e.g., a required entry field), and a description has been entered or input by a user into entry field 316 (which may be an optional or non-required entry field, for example).

Figure 5:
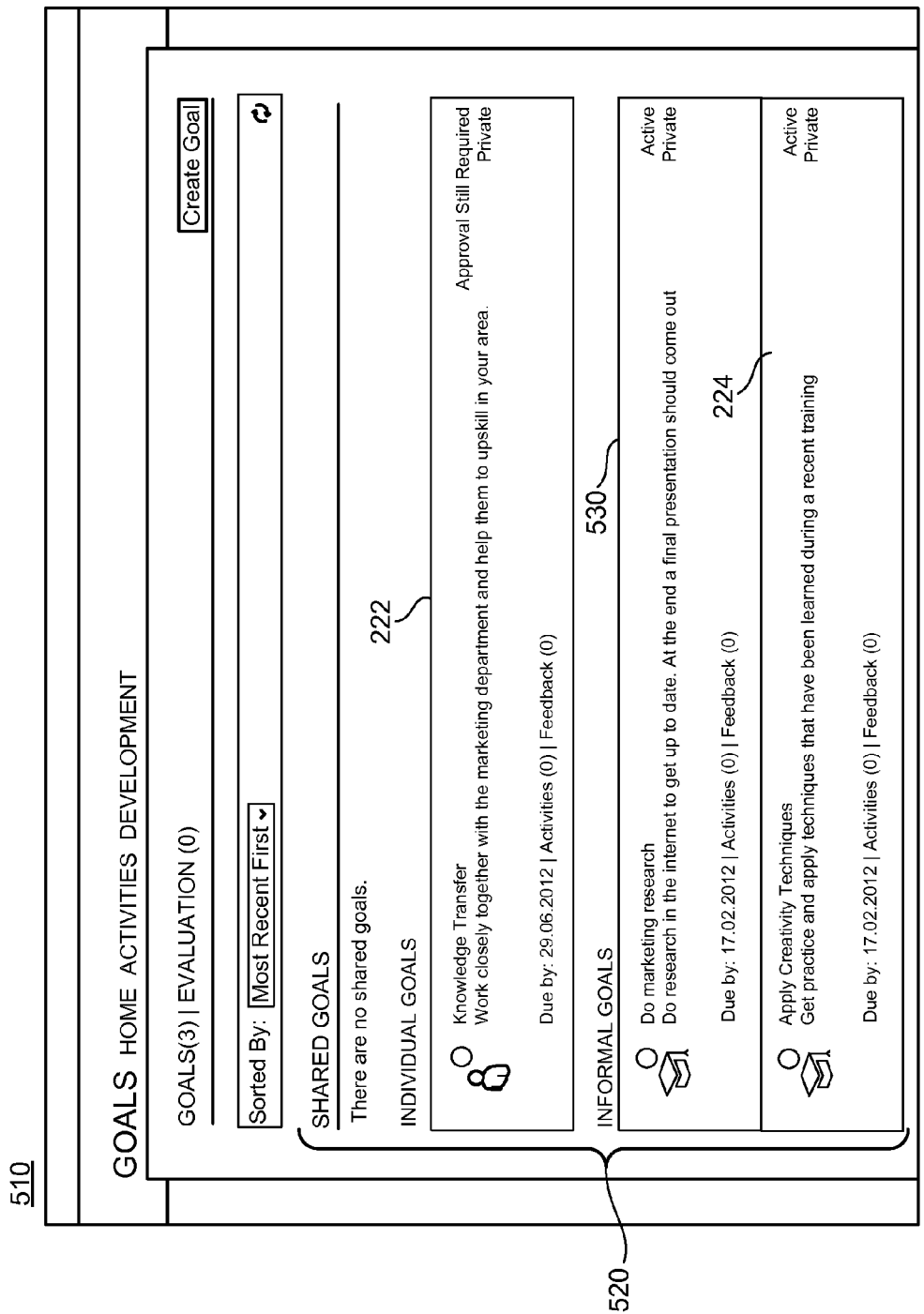
FIG. 5 is a diagram illustrating an application window 510 that is generated by business application 120 and provided to client computer 130 for display according to an example implementation.

FIG. 5 is a diagram illustrating an application window 510 that is generated by business application 120 and provided to client computer 130 for display according to an example implementation. After a user inputs or types in data for one or more entry fields (e.g., 314, 316, 318, . . . ) and select the save icon 320 for the new business object (FIG. 4), the business object creation interface 312 is closed or removed from the application window 410/510, and the information input by the user into business object creation interface 312 for the new business object is saved and displayed as a new business object 530 that is displayed as part of an updated list 520 of existing business objects. Thus, in the example list 520 of updated existing business objects displayed on application window 510, business object 530 is added to the business objects of type "informal goals."

According to an example implementation, a visual or graphical indication may be provided on the application window 510 to identify the new business object 530 that has just been added to the list of existing business objects. A visual or graphical indication or identification of the newly added business object may be provided by providing at least a portion of the new business object in a color, font, text size, etc., that is different from the other business objects of the list 520. For example, color highlighting may be used to identify the new business object, e.g., where the text or background color of the new business object is provided in a color that is different than a color or background color of other business objects on the list of existing business objects. For example, text for business objects 224 and 222 may be provided in black or blue color, while the new business object 530 may be provided in red or other color, or highlighted in yellow or blinking or other color highlighting or visual indication to identify the new business object.

This visual indication, e.g., color highlighting or other visual or graphical indication to identify the new business object 530 that has been added to the list 520 of existing business objects may be temporary. For example, this visual indication or color highlighting for the new business object may be terminated or discontinued after a specific time period (e.g., after 4 minutes since the object was added to the list), or after a specific event occurs or is detected by business application 120. For example, business application 120 may terminate or discontinue the visual indication or color highlighting of the new business object after receiving a selection of closing of the application window (e.g., 510) by a user, or after receiving a request to create another new business object (e.g., receiving a further selection of the create business object icon 240 to create a second new business object), or other event. For example, once one of these events is detected by business application 120, business application 120 may terminate or cease providing the visual indication or color highlighting to identify the new business object, since the business object 530 may no longer be considered to be a new object once one of these events has occurred, for example. Thus, for example, if red text is used to identify an object as a new business object on a list of business objects, the red text may be changed from red to the color (e.g., black) of the other objects on the list of business objects when the business application 120 terminates or discontinues the color highlighting.

Figure 6:
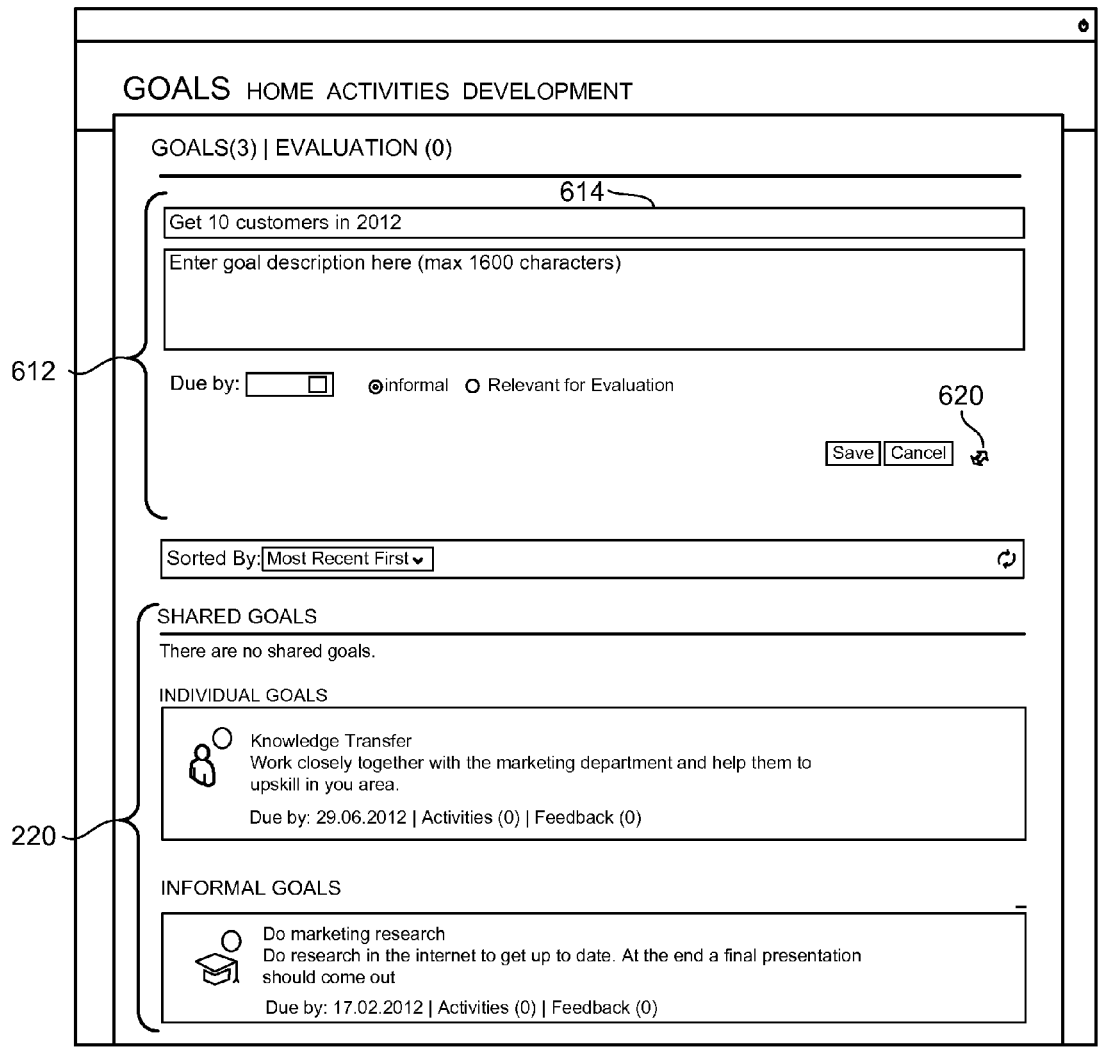
FIG. 6 is a diagram illustrating an application window 610 that is generated by business application 120 and provided to client computer 130 for display according to an example implementation.

FIG. 6 is a diagram illustrating an application window 610 that is generated by business application 120 and provided to client computer 130 for display according to an example implementation. Application window 610 may include a list 220 of existing business objects, a business object creation interface 612, a full business object icon 620, and other items or blocks. The business object creation interface 612 includes several fields, including a title field 614 in which a title of the new goal or business object has been entered as "Get 10 new customers in 2012."

As noted above, a business object creation interface 612 may include less than all, or less than a full set, of the entry fields for a business object. By including only a subset of entry fields (e.g., only required fields, and possibly one or few non-required fields) within the business object creation interface 612, this may better allow the business object creation interface 612 to be inserted or provided within an application window 610, and still allow both the business object creation interface 612 and the list 220 of existing business objects to be viewed or displayed together on the same application window.

However, in some cases, a user may want to input text for one or more entry fields that are not provided in the subset of entry fields of the business object creation interface 612. In application window 610, a user at client computer 130 may press or select the full business object icon 620, and this selection of the full business object icon 620 is then sent from client computer 130 to business application 120. In response to receiving the selection (or a signal indicating a selection) of the full business object icon 620, business application 120 may generate or provide a new window (separate from application window 510/610) to client computer 130 that is displayed on display 132 that includes all of the entry fields or a full set (or at least a fuller set or greater set) of entry fields for the new business object.

Thus, the new window that is opened in response to selection of the full business object icon 620 includes a greater number of entry fields as compared to the number of entry fields for the business object creation interface 612 for the new business object. For example, a business object creation interface 612 may include 3 or 4 entry fields, e.g., 3 required fields and 1 non-required (or optional) field, whereas the new window that is opened in response to selection of the full business object icon 620 may include a full or complete set of fields, e.g., 5 or more fields, 10 or more fields, 15 or more fields, as some examples. These are merely some examples, and others may be used or provided.

FIG. 7 is a diagram illustrating a new application window 710 that is opened or generated by business application 120 and provided to client computer 130 for display in response to a user selection of a full business object icon according to an example implementation. According to an example implementation, business application 120 may open application window 710 as a new window (separate from the application window 610), and may remove or close the business object creation interface 612 in the original application window 610, in response to receiving a user selection of the full business object icon 620 (FIG. 6). The business object creation interface 612 of original application window 610 (which includes the list 220 of existing business objects) may be removed or closed in response to the selection of the full business object icon 620 (or closed when the full business object window 710 is opened or generated) to avoid duplication or redundancy of fields for the new business object, e.g., fields for the new business object may be filled-in or accessed only within the full business object window 710, when open.

The full business object window 710 may include a full or complete set (or fuller or more complete set) of fields for the new business object as compared to a subset (or less than a complete set) of fields being provided for the new business object within the business object creation interface 612 within the original application window 610. Thus, for example, full business object window 710 may include some fields (e.g., title field 714, description field 716) that were included within the business object creation interface 612, as well as one or more additional fields that were not included within the business object creation interface 612. For example, full business object window 710 (FIG. 7) may include additional fields that were not included in the business object creation interface 612 (FIG. 6), such as field 718, business unit field 720, owner field 722, and field 724, as examples.

The full business object window 710 may also include save icon 726 to allow a user to save the information of window 710 to an updated list of business objects. A cancel icon 728 may allow a user to close the full business object window and cancel the creation of the new business object. This is merely an example, and other examples or fields may be used.

According to an example implementation, business application 120 may insert into (or pre-fill) title field 714 of the new window 710 the title of the business object (or title of the goal) that was input by a user into title field 614 of the business object creation interface 612 (see FIG. 6) before the full business object icon 620 was selected by the user. Thus, business application 120 may pre-populate or pre-fill one or more fields of the new (full business object) window 710 based on information input to corresponding fields of business object creation interface 612, for example. Thus, as an example, as shown, the title field 714 of new window 710 (FIG. 7) is pre-filled when full business object window 710 is generated or opened by business application 120 based on the information input to title field 614 of business object creation interface 612 (FIG. 6) of application window 610. Thus, in this example, the title field 714 within the full business object window 710 (FIG. 7) has been pre-filled by application 120 as "Get 10 new customers in 2012", based on the same information input into field 614 of business object creation interface 612 (FIG. 6).

Figure 8:
FIG. 8 is a diagram illustrating an application window 810 that is generated by business application 120 and provided to client computer 130 for display in response to a user selection of a save icon to save a new business object according to an example implementation.

FIG. 8 is a diagram illustrating an application window 810 that is generated by business application 120 and provided to client computer 130 for display in response to a user selection of a save icon to save a new business object according to an example implementation. A user may select save icon 726 (FIG. 7) of the new business object window 710 to cause business application 120 to save the information input into the fields of full business object window 710 as a new business object that will be added to the list 220/820 of existing business objects. Application window 810 (FIG. 8) is then displayed to the user, where the application window 810 includes an updated list 820 of existing business objects, where the list 820 includes the new business object 830 that was created and stored based on the information input via the fields of the full business object window 710.

Therefore, according to an example implementation, a two level approach may be provided to create a new business object that includes: 1) insertion of business object creation interface (e.g., area 612) into an existing application window (e.g., window 610) that includes a list (e.g., list 220) of existing business objects, where the business object creation interface 612 may include only a subset (or less than a full set) of the fields for the new business object; and 2) if needed or requested, the opening or creation of a new business object window (e.g., window 710), as a separate window, that includes a full or complete (or at least more complete) set of fields for the new business object. In this manner, a user may quickly create a new business object while taking advantage of a single application window that includes both a list of existing business objects and a business object creation interface with only a few or a subset of fields (e.g., only required fields, or only required plus one or few non-required fields) for the new business object. Use of the single application window (e.g., 610) may avoid a user from needing to arrange or switch between different windows, and the user can more easily view both the list 220 of existing business objects and the fields for the new business object (e.g., within area 612). If access to a complete or full (or more complete) set of fields for the creation of the new business object is desired, a full business object icon 620 may be selected by the user to cause a new business object window 710 to be opened, which will be provided as a window that is separate from the original application window 610.

Figure 9:
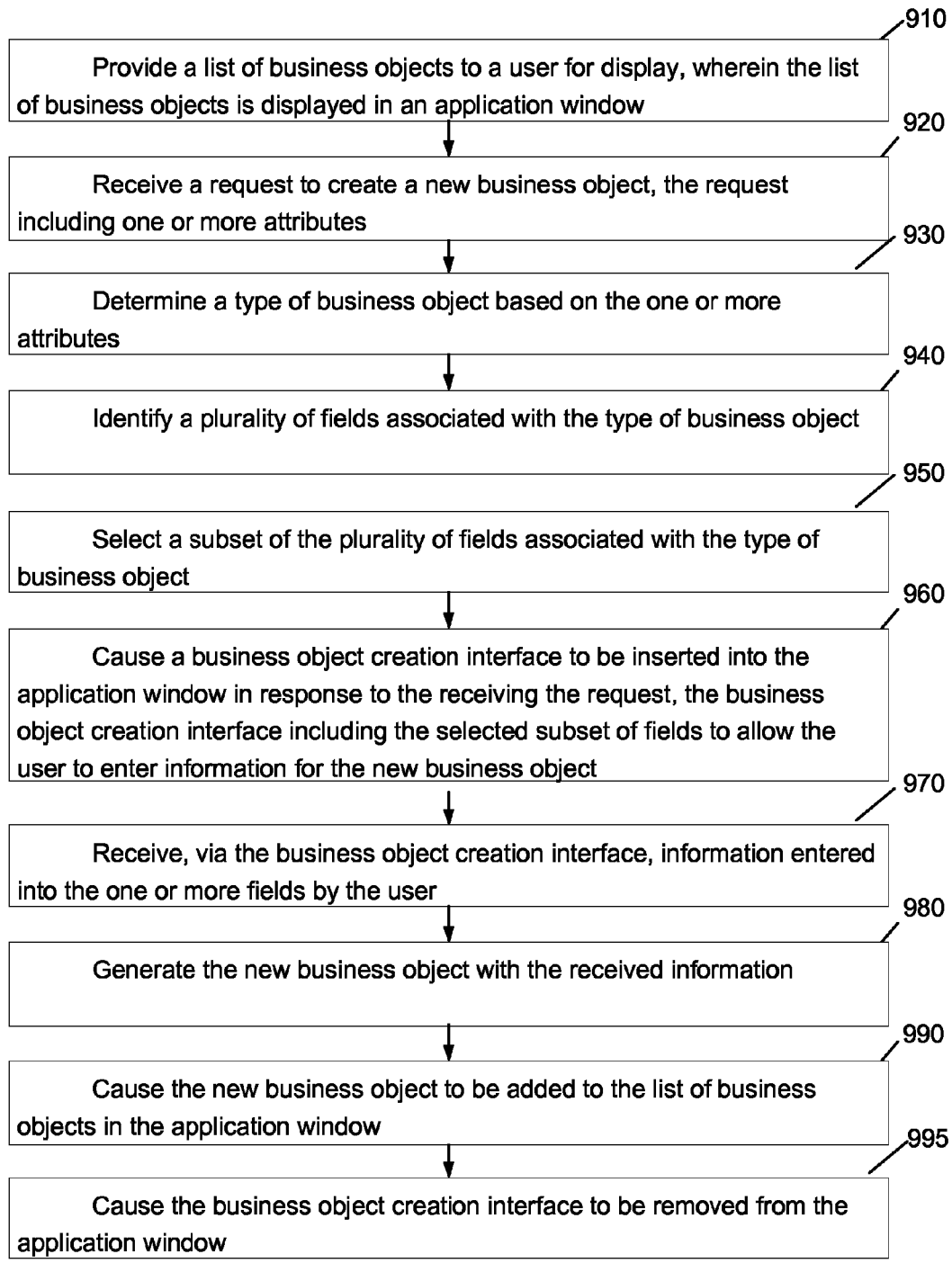
FIG. 9 is a flow chart illustrating operation of business application 120 according to an example implementation.

FIG. 9 is a flow chart illustrating operation of computer system according to an example implementation. At 910, providing a list of business objects is provided to a user for display, wherein the list of business objects is displayed in an application window. At 920, a request is received to create a new business object, the request including one or more business object attributes. In some embodiments, the one or more business object attributes included in the request identifies a business object type for the new business object. At 930, a type of business object is determined based on the one or more business object attributes. At 940, a plurality of fields associated with the type of business object is identified. At 950, a subset of the plurality of fields associated with the type of business object is selected. At 960, a business object creation interface is caused to be inserted into the application window in response to the receiving the request, the business object creation interface including the selected subset of fields to allow the user to enter information for the new business object. In some embodiments, the new business object and the list of business objects are displayed in a continuous region of the application window. In some embodiments, the business object creation interface and the list of business objects are displayed in a continuous region of the application window. At 970, information entered into the one or more fields by the user is received via the business object creation interface. At 980, the new business object is generated with the received information. At 990, the new business object is caused to be added to the list of business objects in the application window. And, at 995, the business object creation interface is caused to be removed from the application window. According to an ex ample implementation, the method of FIG. 9 may further include receiving a selection of a full business object icon that is displayed within the business object creation interface, and in response to receiving the selection of the full business object icon, opening a new window that includes a full set of entry fields for the new business object.

The user may request additional fields of the new business object to be displayed in the business object creation interface. In some embodiments, in response to receiving a request to display additional fields of the new business object, at least one additional field to display is selected and the selected additional field is displayed in the business object creation interface. In some embodiments, a request to receive additional fields of the new business object is received and in response to receiving the request to display additional fields, a new window that includes a full set of entry fields for the new business object is displayed.

In some embodiments, the subset of the plurality of fields is identified based on usage scores of the user for the plurality of fields. The user's usage score for a respective field may be based on the frequency in which the user enters information into the field when creating new business objects. For example, the usage may enter information into a respective field 90% of the time when creating new business objects. In some embodiments, the user's usage score for a respective field may be based on the number of times the user has entered information into the respective field. In some embodiments, the user's usage score for a respective field may be based on the number of times the user enters information into the respective field over a period of time. For example, the user may use a field three times a week. In some embodiments, the subset of the plurality of fields comprises a predefined number of fields having the highest usage scores.

In some embodiments, the subset of the plurality of fields is identified based on usage scores of a group of users for the plurality of fields, where the group of users includes the user. The group of users may be an organization unit or group of which the user belongs. For example, the user may belong to development team. A group of user's usage score for a respective field may represent the group's aggregate score for the field. For example, if the user is a part of a sales team, the usage score for a respective field may represent the sales team's score for the field. The group's usage score for a respective field may represent the frequency in which the group enters information for the respective field when creating new business objects. In some embodiments, the group's usage score for a respective field may be based in part on the number of times users from the group entered information into the field. In some embodiments, the group's usage score for a respective field may be based in part on the number of times users from the group enter information into the field over a period of time. In some embodiments, the subset of the plurality of fields comprises a predefined number of fields having the highest group usage scores.

In some embodiments, the subset of the plurality of fields with the user or the group of users comprise a subset of the plurality of fields for the type of object that have been specified by the user, a subset of the plurality of fields for the type of object that are most commonly used by the user, a subset of the fields for the type of object that are associated with a business organizational unity or group in which the user works and, a subset of the fields for the type of the object that are associated with a manager for which a user works.

In some embodiments, the subset of the plurality of fields is identified based on organizational role of the user. For example, if the user has the title of sales associate, fields most commonly used by sales associates are identified.

In some embodiments, the subset of the plurality of fields is selected based on the type of the business object. The most commonly used fields for the type of object may be identified. For example, when a business object for a sales object is selected fields relating to sales may be selected.

In some embodiments, the type of business object is associated with a business organization or group of which the user is associated. For example, sales groups may be associated with types of business objects for transactions.

According to an example implementation, the method of FIG. 9 may further include temporarily color highlighting the new business object that is displayed on the list of existing business objects, the color highlighting of the new business object in the list of existing business objects being terminated after one or more events occurs, the events including at least one of the application window being closed, or receiving an additional selection of a create business object icon to create a second new business object.

According to an example implementation, the method of FIG. 9 may further include receiving a selection of a full business object icon that is displayed on the business object creation interface, and opening a new window that includes a greater number of entry fields for the new business object than is provided by the business object creation interface.

According to an example implementation, the method of FIG. 9 may further include receiving information from a user for one or more of the entry fields in the new window, receiving a selection of a save icon for the new window, and saving the information received for the entry fields of the new window as a new business object in the list of existing business objects displayed on the application window.

According to an example implementation, in the method of FIG. 9, after the business object creation interfaces has been inserted into the application window and before the business object creation interface has been removed, the business object creation interface and at least a portion of the list of existing business objects are viewable together at the same time on the displayed application window.

According to an example implementation, in the method of FIG. 9, after the business object creation interface has been inserted into the application window and before the business object creation interface has been removed, the displayed application window may be scrollable to view the business object creation interface in parallel with or at the same time as the list of existing business objects.

Figure 10:
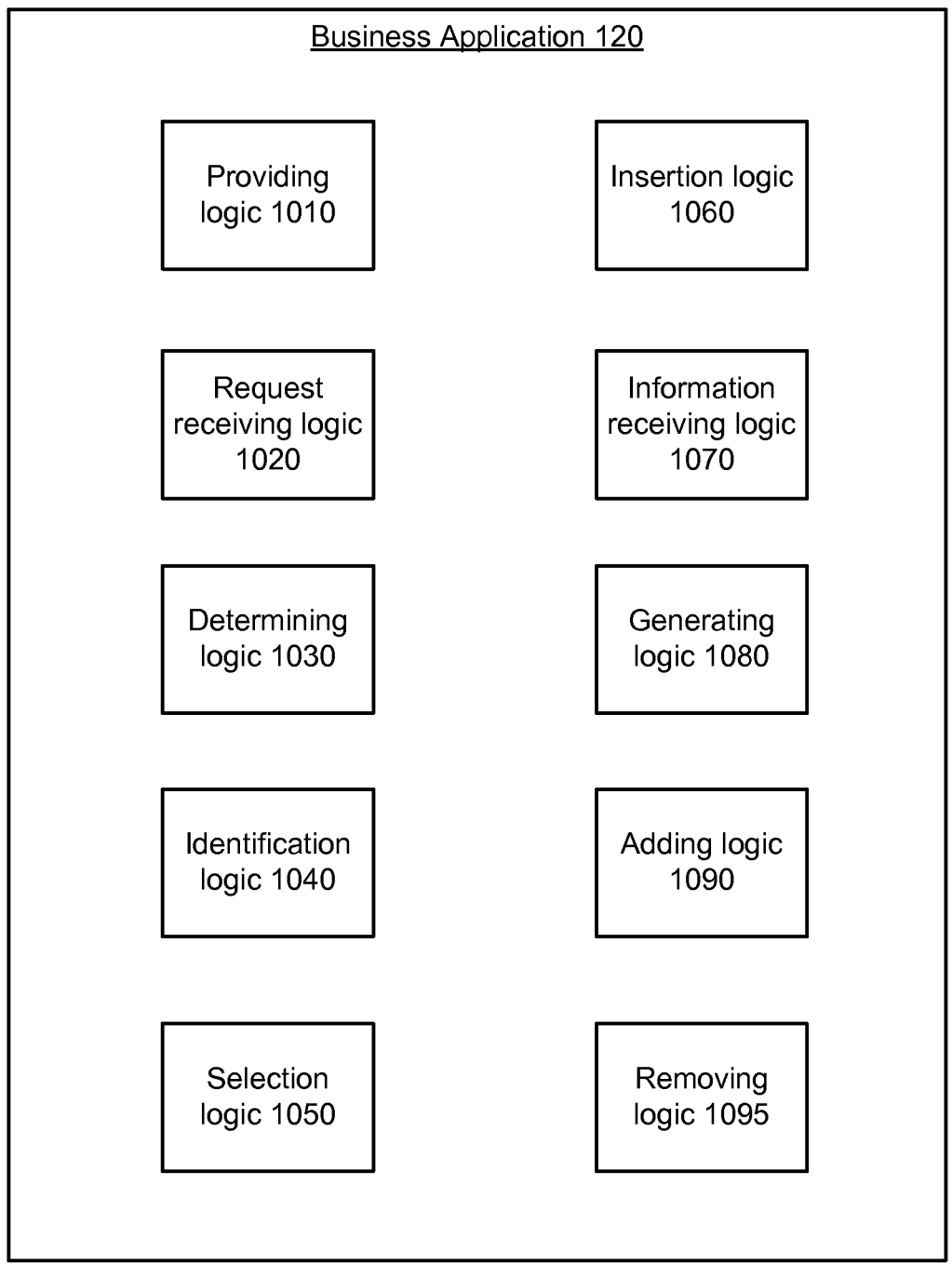
FIG. 10 is a block diagram illustrating a business application according to an example implementation.

FIG. 10 is a block diagram illustrating a business application according to an example implementation. The business application 120 may include providing logic 1010 configured to provide a list of business objects to a user for display, wherein the list of business objects is displayed in an application window, request receiving logic 1020 configured to receive a request to create a new business object, the request including one or more attributes, determining logic 1030 configured to determine a type of business object based on the one or more attributes, identification logic 1040 configured to identify a plurality of fields associated with the type of business object, selection logic 1050 configured to select a subset of the plurality of fields associated with the type of business object, insertion logic 1060 configured to cause a business object creation interface to be inserted into the application window in response to the receiving the request, the business object creation interface including the selected subset of fields to allow the user to enter information for the new business object, information receiving logic 1070 configured to receive, via the business object creation interface, information entered into the one or more fields by the user, generating logic 1080 configured to generate the new business object with the received information, adding logic 1090 configured to cause the new business object to be added to the list of business objects in the application window, and removing logic 1095 configured to cause the business object creation interface to be removed from the application window. Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-readable non-transitory storage medium storing one or more programs, the one or more programs comprising instructions, which when executed by a server system hosting a business application, cause the server system to:
    access, via the business application, control information and display information of a user interface (UI) model to generate an application window for display in a client application, the displayed application window including a create business object icon whose functions are specified by control information of the UI model;
    display a list of business objects being used in the business application in the application window;
    receive a request to create a new type of business object in the displayed list of business objects, the request including one or more business object attributes;
    determine the type of business object based on the one or more business object attributes;
    retrieve a new business object of the determined type from a business objects repository;
    identify and select a subset of a plurality of fields associated with the retrieved business object; and
    move at least a portion the displayed list of business objects up or down to create an open area in the application window for a business object creation interface to be inserted into the application window in response to the receiving the request, the business object creation interface including the selected subset of the plurality of fields associated with the retrieved business object to allow the user-entry of information for the new retrieved business object,
    wherein the one or more programs further include instructions to cause the server system to temporarily color highlight the new business object, the color highlighting of the new business object being terminated after one or more events occur, the events including at least one of the application window being closed, or receiving an additional selection of a create business object icon to create a second new business object.

2. The computer readable storage medium of claim 1, wherein the one or more programs further include instructions to cause server system to:
    in response to receiving a request to display additional fields of the new business object to allow the user to enter additional information for the new business object:
    select at least one additional field to display; and
    cause the at least one additional field to be displayed in the business object creation interface to allow the user to enter additional information for the new business object.

3. The computer readable storage medium of claim 1, wherein the one or more programs further include instructions to cause the server system to:
    receive a request to display additional fields of the new business object;
    in response to receiving the request to display additional fields, display a new window that includes a full set of entry fields for the new business object.

4. The computer readable storage medium of claim 1, wherein the one or more business object attributes included in the request identifies a business object type for the new business object.

5. The computer readable storage medium of claim 1, wherein the subset of the plurality of fields is identified based on usage scores of the user for the plurality of fields.

6. The computer readable storage medium of claim 1, wherein the subset of the plurality of fields are identified based on usage scores of a group of users for the plurality of fields, wherein the group of users includes the user.

7. The computer readable storage medium of claim 1, wherein the subset of the plurality of fields is identified based on an organization role of the user.

8. The computer readable storage medium of claim 1, wherein the subset of the plurality of fields is selected based on the type of the business object.

9. The computer readable storage medium of claim 1, wherein the type of business object is associated with a business organization unit or group of which the user is associated.

10. The computer readable storage medium of claim 9, wherein the subset of fields associated with a user or a group of users comprise at least one of the following:
- a subset of fields for the type of object that have been specified by a user;
- a subset of fields for the type of object that are most commonly used by a user;
- a subset of fields for the type of object that are associated with a business organizational unit or group in which the user works; and
- a subset of fields for the type of object that is associated with a manager for which a user works.

11. The computer readable storage medium of claim 1, wherein the one or more programs further include instructions to cause server system to color highlight the new business object that is displayed as part of the list of business objects.

12. The computer readable storage medium of claim 1, wherein after the business object creation interface has been inserted into the application window and before the business object creation interface has been removed, the business object creation interface and at least a portion of the list of existing business objects are viewable together at the same time on the displayed application window.

13. The computer readable storage medium of claim 1, wherein after the business object creation interfaces has been inserted into the application window and before the business object creation interface has been removed, the displayed application window is scrollable to view the business object creation interface in parallel or at the same time as the list of existing business objects.

14. The computer readable storage medium of claim 1, wherein the business object creation interface and the list of business objects are displayed in a continuous region of the application window.

15. The computer readable storage medium of claim 1, wherein the new business object and the list of business objects are displayed in a continuous region of the application window.

16. A computer-implemented method comprising:
- providing a list of business objects used in a business application;
- displaying the list of business objects in an application window in a client application;
- receiving a request to create a new type of business object in the displayed list of business objects in the application window, the request including one or more business object attributes;
- determining a type of business object based on the one or more business object attributes;
- retrieving a new business object of the determined type from a business objects repository;
- identifying a plurality of fields associated with the retrieved business object; and
- selecting a subset of the plurality of fields associated with the retrieved business object;
- causing a business object creation interface to be inserted into the application window in response to the receiving the request, the business object creation interface including the selected subset of fields to allow user-entry of information for the new business object;
- receiving, via the business object creation interface, information entered into the one or more fields;
- generating the new business object with the received information;
- causing the new business object to be added to the list of business objects displayed in the application window; and
- causing the business object creation interface to be removed from the application window, wherein causing the new business object to be added to the list of business objects displayed in the application window includes temporarily color highlighting the new business object, the color highlighting of the new business object being terminated after one or more events occurs, the events including at least one of the application window being closed, or receiving an additional selection of a create business object icon to create a second new business object.

17. A system comprising:
one or more processors and a memory;
providing logic configured to provide a list of business objects used in a business application and display the list of business objects in an application window in a client application;
request receiving logic configured to receive a request to create a new type of business object in the displayed list of business objects, the request including one or more business object attributes;
determining logic configured to determine a type of business object based on the one or more business object attributes;
retrieving logic configured to retrieve a new business object of the determined type from a business objects repository;
identification logic configured to identify a plurality of fields associated with the retrieved business object; and
selection logic configured to select a subset of the plurality of fields associated with retrieved business object;
insertion logic configured to cause a business object creation interface to be inserted into the application window in response to the receiving the request, the business object creation interface including the selected subset of fields to allow user-entry of information for the new business object;
information receiving logic configured to receive, via the business object creation interface, information entered into the one or more fields;
generating logic configured to generate the new business object with the received information;
adding logic configured to cause the new business object to be added to the list of business objects in the application window, wherein the adding logic is further configured to temporarily color highlight the new business object, the color highlighting of the new business object being terminated after one or more events occurs, the events including at least one of the application window being closed, or receiving an additional selection of a create business object icon to create a second new business object; and
removing logic configured to cause the business object creation interface to be removed from the application window.

18. The system of claim 17 further configured to:
in response to receiving a request to display additional fields of the new business object to allow the user to enter additional information for the new business object,
select at least one additional field to display, and
cause the at least one additional field to be displayed in the business object creation interface to allow the user to enter additional information for the new business object.

19. The system of claim 17 further configured to receive a request to display additional fields of the new business object, and in response, display a new window that includes a full set of entry fields for the new business object.

20. The method of claim 16 further including:
   in response to receiving a request to display additional fields of the new business object to allow the user to enter additional information for the new business object,
   selecting at least one additional field to display, and
   causing the at least one additional field to be displayed in the business object creation interface to allow the user to enter additional information for the new business object.

* * * * *